(12) United States Patent
Geiselberger et al.

(10) Patent No.: US 11,511,789 B2
(45) Date of Patent: Nov. 29, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Thomas Geiselberger, St. Gallen (CH); Benedikt Heigenhauser, Bern (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/284,823

(22) PCT Filed: Oct. 23, 2019

(86) PCT No.: PCT/EP2019/078809
§ 371 (c)(1),
(2) Date: Apr. 13, 2021

(87) PCT Pub. No.: WO2020/083967
PCT Pub. Date: Apr. 30, 2020

(65) Prior Publication Data
US 2021/0237791 A1 Aug. 5, 2021

(30) Foreign Application Priority Data
Oct. 24, 2018 (DE) .................... 10 2018 218 243.4

(51) Int. Cl.
*B62D 1/19* (2006.01)
*B62D 1/181* (2006.01)
(Continued)

(52) U.S. Cl.
CPC ............ *B62D 1/195* (2013.01); *B62D 1/181* (2013.01); *B62D 1/185* (2013.01); *F16C 3/03* (2013.01); *F16C 2326/24* (2013.01)

(58) Field of Classification Search
CPC ........ B62D 1/195; B62D 1/181; B62D 1/185; F16C 3/03; F16C 2326/24
See application file for complete search history.

(56) References Cited

U.S. PATENT DOCUMENTS 4,752,085 A * 6/1988 Yamamoto ............. B62D 1/181
280/775
5,520,416 A * 5/1996 Singer, III ............. B62D 1/195
280/775
(Continued)

FOREIGN PATENT DOCUMENTS

CN 103223971 A * 7/2013 ............. B62D 1/181
CN 104411565 A 3/2015
(Continued)

OTHER PUBLICATIONS

English Translation of International Search Report issued in PCT/EP2019/078809, dated Jan. 21, 2020.
(Continued)

*Primary Examiner* — Drew J Brown
(74) *Attorney, Agent, or Firm* — thyssenkrupp North America, LLC

(57) ABSTRACT

A steering column that is adjustable by a motor may include a supporting unit that is attachable to a vehicle body, an actuating unit held by the supporting unit, a steering spindle mounted in the actuating unit rotatably about a longitudinal axis, an adjusting drive for adjusting the actuating unit relative to the supporting unit via a threaded spindle and spindle nut, and a drive unit by which the threaded spindle can be driven rotationally relative to the spindle nut. To improve compactness and greater structural freedom, the drive unit may be connected via a flexible drive connection to a gear unit that can be moved spatially relative to the drive unit.

20 Claims, 6 Drawing Sheets

(51) Int. Cl.
*B62D 1/185* (2006.01)
*F16C 3/03* (2006.01)

(56) References Cited

U.S. PATENT DOCUMENTS

| | | | |
|---|---|---|---|
| 5,690,362 A | 11/1997 | Peitsmeier | |
| 5,820,163 A * | 10/1998 | Thacker | B62D 1/195 280/775 |
| 10,023,222 B2 * | 7/2018 | Tinnin | B62D 1/192 |
| 10,464,592 B2 * | 11/2019 | Messing | F16H 25/20 |
| 11,052,935 B2 * | 7/2021 | Schacht | F16C 19/06 |
| 2003/0079563 A1 | 5/2003 | Rouleau | |
| 2009/0095114 A1 | 4/2009 | Ridgway | |
| 2013/0110353 A1 | 5/2013 | Tanaka | |
| 2015/0028574 A1 | 1/2015 | Meyer et al. | |
| 2015/0232117 A1 | 8/2015 | Stinebring | |
| 2015/0375767 A1 | 12/2015 | Agbor et al. | |
| 2016/0046318 A1 | 2/2016 | Stinebring | |
| 2017/0120945 A1 | 5/2017 | Stinebring | |
| 2017/0341677 A1 | 11/2017 | Buzzard | |
| 2017/0369091 A1 | 12/2017 | Nash | |
| 2018/0251147 A1 | 9/2018 | Heitz et al. | |
| 2018/0281840 A1 | 10/2018 | Yoon et al. | |

FOREIGN PATENT DOCUMENTS

| | | |
|---|---|---|
| CN | 108025758 A | 5/2018 |
| CN | 108688713 A | 10/2018 |
| DE | 195 24 196 C | 11/1996 |
| DE | 30 2004 012 021 T | 3/2009 |
| DE | 10 2011 083 190 A | 3/2013 |
| DE | 10 2018 204 735 A | 10/2018 |
| EP | 0 705 754 B | 12/1998 |
| EP | 2 586 677 A | 5/2013 |
| EP | 2 822 836 B | 8/2016 |

OTHER PUBLICATIONS

"Lenksäule für ein Kraftfahrzeug", (English Machine Translation) Notification according to rule 114 (2) EPC dated Oct. 19, 2022 (Third Party Observation).

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2019/078809, filed Oct. 23, 2019, which claims priority to German Patent Application No. DE 10 2018 218 243.4, filed Oct. 24, 2018, the entire contents of both of which are incorporated herein by reference.

FIELD

The present disclosure generally relates to adjustable steering columns for motor vehicles.

BACKGROUND

Steering columns for motor vehicles have a steering shaft with a steering spindle, to the rear (in the driving direction) end of which, which faces the driver, a steering wheel for the introduction of a steering command by way of the driver is attached. The steering spindle is mounted such that it can be rotated about its longitudinal axis in an actuating unit which is held on the vehicle body by a supporting unit. By virtue of the fact that an inner casing tube of the actuating unit (also called a casing tube for short in the following text) is received such that it can be displaced in a telescopic manner in the direction of the longitudinal axis in a casing unit (also called a guide box, an outer casing tube or a swing arm) which is connected to the supporting unit, a longitudinal adjustment can take place. A vertical adjustment can be realized by virtue of the fact that the actuating unit or a casing unit which receives it is mounted pivotably on the supporting unit. The adjustment of the actuating unit in the longitudinal and/or vertical direction makes it possible to set an ergonomically comfortable steering wheel position relative to the driver position in the operational position (also called the driving or operating position), in which a manual steering intervention can take place.

It is known in the prior art to provide a motorized adjusting drive with a drive unit for the adjustment of the actuating unit relative to the supporting unit, which drive unit comprises an electric actuating motor which is connected, as a rule via a gear mechanism, to a spindle drive which comprises a threaded spindle which is screwed into a spindle nut. By way of the drive unit, the threaded spindle and the spindle nut can be driven rotationally with respect to one another about the threaded spindle axis, as a result of which, depending on the rotational direction, they can be moved in a translational manner toward one another or away from one another. In one embodiment, what is known as a rotational spindle drive, the threaded spindle can be driven rotationally about its threaded spindle axis by the drive unit which is connected in a stationary manner to the actuating unit or the supporting unit, and said threaded spindle engages into the spindle nut which is attached to the supporting unit or the actuating unit in a stationary manner with regard to rotation about the threaded spindle axis. The threaded spindle is supported on the supporting unit or the actuating unit in the direction of the threaded spindle axis, and the spindle nut is supported correspondingly on the actuating unit or the supporting unit, with the result that a rotational drive of the threaded spindle brings about a translational adjustment of the supporting unit and the actuating unit relative to one another. In one alternative embodiment which is called a plunger spindle drive, the threaded spindle is coupled to the supporting unit or the actuating unit such that it cannot be rotated with regard to rotation about its threaded spindle axis, and the spindle nut is mounted correspondingly on the actuating unit or the supporting unit such that it can be rotated but is stationary in the direction of the threaded spindle axis. As in the first embodiment, the threaded spindle is supported on the supporting unit or the actuating unit in the direction of the threaded spindle axis, and the spindle nut is supported correspondingly on the actuating unit or the supporting unit, with the result that the threaded spindle can be displaced in a translational manner in the direction of the threaded spindle axis by way of the drive unit. In the two embodiments, the spindle drive forms a motorized adjusting drive which acts between the supporting unit and the actuating unit and by way of which the actuating unit can be adjusted relative to the supporting unit for adjustment purposes.

In order to realize a longitudinal adjustment of the actuating unit in the direction of the longitudinal axis of the steering spindle, a spindle drive of an adjusting drive can be arranged between the casing tube of the actuating unit and a casing unit which receives it in an axially longitudinally displaceable manner and is connected to the supporting unit, and it being possible for the threaded spindle axis to be oriented substantially parallel to the longitudinal axis.

For the vertical adjustment, a spindle drive can be arranged between the supporting unit and an actuating unit which is mounted on it in a vertically pivotable manner. A motorized longitudinal adjustment means and a motorized vertical adjustment means can be configured on a steering column individually or in combination.

In the prior art, DE 195 24 196 C1 describes a steering column, in the case of which the drive unit of an adjusting drive including a drive motor, a gear mechanism and a spindle nut is attached to the casing unit, and the threaded spindle acts on a casing tube of the actuating unit, which casing tube can be adjusted telescopically relative thereto.

DE 10 2011 083 190 A1 has disclosed a similar arrangement, in the case of which the drive unit which is formed from a drive motor and a gear mechanism is likewise attached to the casing unit which is connected to the supporting unit.

A disadvantage of the known embodiments is the relatively great installation space requirement for the adjusting drive in the region of the actuating unit, as a result of which the structural possibilities for adaptation to the installation space which is available in the vehicle are limited.

Thus, a need exists for an improved steering column which makes a compact design and greater structural freedom for the utilization of an available installation space possible.

DETAILED DESCRIPTION

Figure 1:
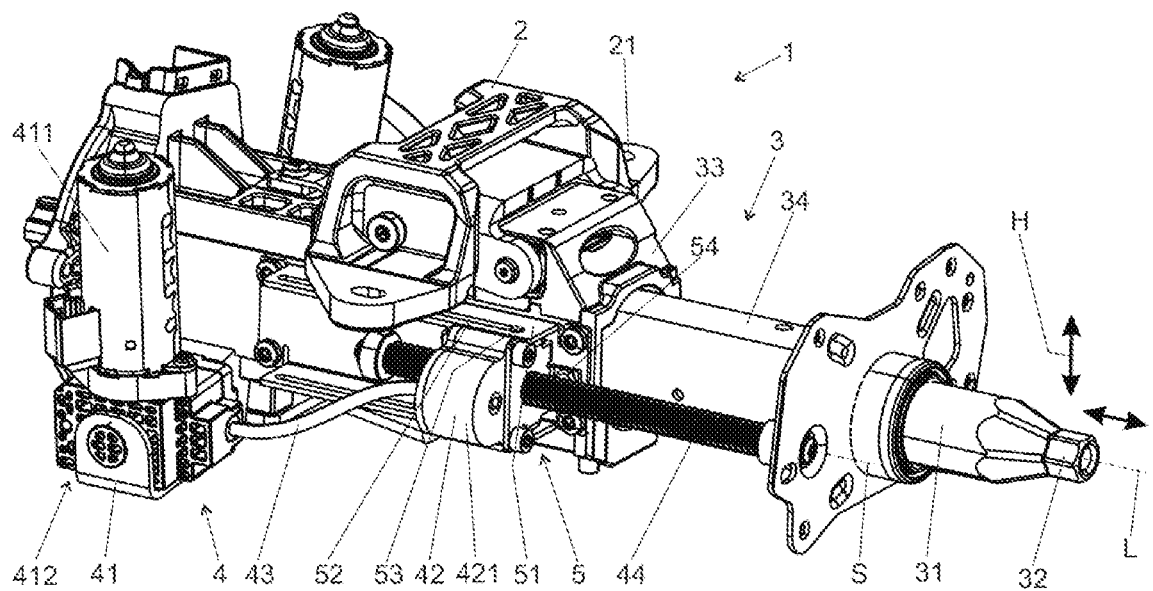
FIG. 1 is a diagrammatic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a steering column for a motor vehicle that is adjustable via a motor may comprise a supporting unit which can be attached to a vehicle body and by which an actuating unit is held, in which a steering spindle is mounted such that it can be rotated about a longitudinal axis, and comprising an adjusting drive which is connected to the supporting unit and to the actuating unit, and by which the actuating unit can be adjusted relative to the supporting unit, the adjusting drive having a threaded spindle, which engages into a spindle nut, and a drive unit, by which the threaded spindle can be driven rotationally relative to the spindle nut.

According to the invention, in the case of a steering column for a motor vehicle, which steering column can be adjusted by motor, comprising a supporting unit which can be attached to a vehicle body and by which an actuating unit is held, in which a steering spindle is mounted such that it can be rotated about a longitudinal axis, and comprising an adjusting drive which is connected to the supporting unit and to the actuating unit, and by which the actuating unit can be adjusted relative to the supporting unit, the adjusting drive having a threaded spindle, which engages into a spindle nut, and a drive unit, by which the threaded spindle can be driven rotationally relative to the spindle nut, it is provided that the drive unit is connected via a flexible drive connection to a gear unit which can be moved spatially relative to the drive unit.

In contrast to the prior art, in the case of which the gear mechanism is fixed structurally to the drive unit in a rigid and spatially unalterable manner, the drive unit and the gear unit are separated from one another spatially and structurally in the case of the invention. The drive unit forms a first assembly which can comprise the drive motor and optionally a gear mechanism, and the gear unit forms a second assembly which is separate therefrom and can have a gearwheel, which is connected to the spindle nut or the threaded spindle, and further gear mechanism members. For the transmission of the drive torque, a spatially movable, flexible drive connection is used according to the invention between the output of the drive unit and the input of the gear unit. The drive connection comprises a torque transmission means which is configured to be spatially resilient and movable in such a way that a change of the spatial orientation between the drive unit and the gear unit can be compensated for by way of linear displacements and/or tilting in three-dimensional space.

One advantage of the invention results from the fact that the separate gear unit has substantially smaller dimensions than the drive unit in the prior art. Therefore, the gear unit can be mounted, for example, on the supporting unit or the casing unit which is connected to it, even in the case of tight space conditions and a low amount of locally available installation space. By way of a corresponding configuration with regard to length and course of the drive connection, the drive unit can be positioned in a spatially distant manner according to the invention from the gear unit. The positioning can preferably take place in a spatially less critical region within the installation space. This results in a greater freedom of structural design, and the available installation space can be utilized in an improved manner.

It is possible that the gear unit can be moved synchronously with the actuating unit. In the case of the adjustment, the actuating unit is moved spatially relative to the supporting unit which is fixed on the vehicle body. The gear unit can be fixed spatially relative to the actuating unit, for example by way of a direct or indirect connection to the actuating unit, with the result that it is moved synchronously with the actuating unit in the case of the adjustment.

Further advantages result from the fact that the drive connection is spatially variable, and can transmit the torque in a manner which is independent of a defined, aligned orientation of the drive unit and the gear unit. As a result, the mounting is simplified and the operational reliability is increased. Moreover, it is possible for the drive unit and the gear unit to be mounted on functional parts which are moved relative to one another during operation of the steering column, for example in the case of the setting of the steering column, or else in the case of a crash, in the case of which the steering column is compressed by way of high forces which act from the outside.

Furthermore, an adjusting drive can be of modular design in an advantageous way. For example, types of different configuration of drive unit, for example with different drive torques or drive speeds, can be combined with gear units which are adapted specifically for respective applications and have, for example, different gear ratios, or are configured for plunger spindle drives or rotating spindle drives. The drive connection can likewise be adapted in a manner which is specific to the application, for example with regard to length, diameter, bending radius or flexibility, torque which can be transmitted, and permissible rotational speed and the like.

The gear unit preferably has a gear unit housing, in which the gearwheel is received at least partially, the drive unit having a drive unit housing, in which at least one component of the drive motor is received at least partially, the gear unit housing and the drive unit housing being spaced apart from one another, in particular being spaced apart from one another in such a way that the gear unit housing and the drive unit housing do not make contact with one another, that is to say do not bear against one another in a contact-making manner. The spacing between the gear unit housing and the drive unit housing is preferably at least 1 cm.

The drive motor preferably comprises a stator as a first component and a rotor which can be rotated relative to the former as second component.

In order to realize the flexible drive connection, shaft arrangements can be used which can compensate for a spatial and/or angular offset, for example articulated shafts which can have offset-compensating couplings, such as, for example, Oldham couplings, universal joints or constant velocity joints, and/or splined shaft connections or other connections for length compensation.

It is one advantageous embodiment that the flexible drive connection has a flexible shaft. Here, an elongate shaft core which can be bent freely in three-dimensional space serves as torque-transmitting element, for example in the form of a helical spring made from spring steel wire in a similar manner to a speedometer shaft. The shaft core is connected via suitable connector flanges on the output side to the drive unit and on the input side to the gear unit, for example by means of a polygonal profile, preferably a square profile. For protection against external influences, the shaft core can be arranged in a likewise freely bendable corrugated hose. Flexible shafts can be manufactured with different lengths with low complexity. As a result, an adaptation can take place to specific applications and different designs of steering columns in a simple manner.

The gear unit can preferably comprise a gearwheel which is connected fixedly to the spindle nut or the threaded spindle so as to rotate with it and can be driven rotationally by the drive connection. In the case of a plunger spindle drive, a gearwheel which is configured as a spur gear, bevel gear or worm gear can be connected in a torque-transmitting manner to the spindle nut, into which the threaded spindle engages and which is supported on the gear unit axially, that is to say in the direction of the threaded spindle axis. The threaded spindle preferably penetrates the spindle nut completely in the direction of the threaded spindle axis, with the result that it protrudes out of the spindle nut on both sides. In the case of the adjustment, the rotationally driven spindle nut is moved on the stationary threaded spindle in one direction or the opposite direction depending on the rotational direction. In the case of a rotating spindle drive, the threaded spindle is connected in a torque-transmitting manner to the gearwheel, and is supported axially in the gear unit.

As an alternative, it is possible that the threaded spindle or the spindle nut is connected to the drive connection directly in a torque-transmitting manner in the gear unit.

Furthermore, at least one intermediate gear can be mounted in the gear unit, which intermediate gear meshes with the gearwheel and is connected in a torque-transmitting manner to the drive connection, or at least can be driven rotationally by the drive connection. The intermediate gear can be configured, for example, as a spur gear or bevel gear, or as a worm.

Further gear members can possibly be mounted in the gear unit, for example intermediate shafts or intermediate gears, couplings or the like.

It is one advantageous development that the gear unit comprises a multiple-stage gear mechanism, that is to say at least a two-stage gear mechanism. By virtue of the fact that the gear mechanism has at least two gear stages, a high transmission ratio can be realized simply and reliably. This can be configured for the torque-optimized and force-optimized transmission and conversion of the drive torque which is introduced on the input side by the drive unit into the gear unit into the relative linear adjusting movement of the supporting unit and actuating unit.

At least two gear stages preferably have different gear mechanism types. For example, one gear stage can comprise a toothed gear mechanism, for example a spur gear mechanism, and a second gear stage can comprise a worm gear mechanism or a spindle drive with a threaded spindle which engages into a spindle nut. By way of the use of different gear mechanism types, an optimized adaptation to the required transmission properties, dimensions, weight and other operating requirements can take place.

All of the gear stages can preferably be received in a common gear housing. A compact, efficient design which is optimized in terms of installation space is made possible by way of the accommodation of a multiple-stage, at least two-stage gear mechanism in a gear housing.

A common gear housing preferably provides a housing space which is closed toward the outside and in which all or at least a plurality of gear stages can be arranged. As a result, a protected, sealed gear arrangement which is filled with lubricant can be configured, which gear arrangement is substantially maintenance-free or at least low-maintenance over the service life.

The gear housing can preferably be configured in multiple pieces, two or more part housings being joined together by means of releasable or non-releasable connections, for example, after the insertion of the gear stages. The number of part housings or housing parts can be optimized with regard to the manufacturing, for example in a manner which is dependent on the gear types which are used and the like.

The drive unit preferably comprises a drive motor, to which the drive connection is connected on the output side. It is possible that the motor shaft which is coupled to the rotor is coupled to the drive connection in a torque-transmitting manner in the drive unit, with the result that, for example, the shaft core of a flexible shaft is driven at the rotational speed of the drive motor. It is one advantageous refinement that the drive unit has a step-down gear mechanism, to which the drive motor is coupled on the input side and the drive connection is coupled on the output side.

The torque which is to be transmitted by the drive connection and the rotational speed can be stipulated and adapted to the respective application by way of the selection of the step-down gear ratio of a step-down gear mechanism of the drive unit and the transmission ratio which is realized in the gear unit between the drive connection and the spindle nut or threaded spindle.

The drive unit can have a drive housing. The drive motor can be integrated into the drive housing, or can be fixed firmly on the latter, for example by means of a flange connection. Furthermore, a step-down gear mechanism can be realized in the drive housing between the drive motor and the drive connection, for example a worm gear mechanism with a worm which is connected to the motor shaft and meshes with a worm gear which is connected fixedly to the shaft core of the drive connection so as to rotate with it.

The gear unit can have a gear housing which is structurally configured separately from the drive unit. The flexible drive connection according to the invention, for example a flexible shaft, extends between the drive housing and the gear housing. A gearwheel which is connected to the spindle nut or the threaded spindle can be mounted in the gear housing such that it can be rotated about the spindle axis but is fixed axially. An intermediate gear which meshes with the gearwheel and is connected to the drive connection, preferably to the shaft core, can likewise be mounted in the gear housing.

Furthermore, it is possible that the gear unit has fastening means for connection to the supporting unit and/or the actuating unit. The fastening means can be attached to or configured on the gear housing, or can interact with the latter.

It can be provided that the actuating unit has a casing unit, in which a casing tube (also called an inner casing tube), in which the steering spindle is mounted, is received such that it can be adjusted telescopically in the direction of the longitudinal axis. The casing unit is connected to the supporting unit, and is supported against the latter in the direction of the longitudinal axis. The casing tube can be adjusted telescopically relative to the casing unit for longitudinal adjustment.

In order to realize an adjusting drive according to the invention for longitudinal adjustment effectively between the casing unit and the casing tube, the gear unit can preferably be attached to the casing unit, and that part of the spindle drive which can be moved in a translational manner relative to the former can be connected to the casing tube. As a result, the casing tube can be adjusted as part of the actuating unit relative to the supporting unit which supports the casing unit against the vehicle body in the direction of the longitudinal axis.

One advantageous embodiment of the invention provides that an energy absorption device is arranged between the gear unit and the supporting unit.

An energy absorption device serves to increase the occupant safety in the case of a crash. In the case of a crash, a great force is exerted on the actuating unit by way of a body which strikes the steering wheel, which force acts on the spindle drive of the adjusting device of the longitudinal adjustment means in the direction of the threaded spindle axis. This so-called crash force is transmitted to the supporting unit via the spindle drive. A controlled dissipation of the kinetic energy in the case of a crash can take place by way of an energy absorption device, as described, for example, in DE 195 24 196 C1 which was mentioned at the outset, which energy absorption device is arranged between the actuating unit and the supporting unit. Here, the kinetic energy in the case of a displacement, caused by way of the crash force, of the drive unit relative to the supporting unit, or relative to the casing unit which is connected to it, can be absorbed and can be converted into frictional energy and/or deformation energy. A progressive energy absorption which is stipulated in a defined manner preferably takes place along the displacement path of the steering column, which displacement path corresponds substantially to the adjusting travel of the adjusting drive, in accordance with a predefined energy absorption characteristic.

According to the invention, in the case of a crash, the adjusting drive is not moved in its entirety relative to the supporting unit, as in the prior art, or only the threaded spindle or the spindle nut is moved, as in other known embodiments, such as in DE 10 2011 083 190 A1 which was likewise already mentioned at the outset, but rather merely the separate gear unit is moved relative to the supporting unit. The energy absorption device which is incorporated between the gear unit and the supporting unit ensures an energy absorption in accordance with a predefined energy absorption characteristic along a predefined displacement travel of the gear unit with respect to the supporting unit, which displacement travel is also called the crash travel.

An energy absorption device is configured between the casing unit and the gear unit for energy absorption in the direction of the longitudinal axis. A crash force which is exerted by the casing tube via the threaded spindle on the gear unit brings about a movement of the gear unit on a crash travel along the casing unit, kinetic energy being absorbed.

Advantages over a drive unit which is also moved in the case of a crash are the smaller moved masses, and a smaller spatial region which is passed through by the gear unit on the crash travel.

The movement of the gear unit relative to the drive unit in the case of a crash is not impaired significantly by way of the flexible drive connection.

The energy absorption device can have at least one energy absorption element which can be deformed plastically in the case of a movement of the gear unit in the direction of the threaded spindle relative to the supporting unit. An energy absorption element (also synonymously called a crash element) is arranged as a deformation element in the force flow of the crash force which occurs in the case of a crash in the connection between the gear unit and the supporting unit, preferably between the gear unit and the casing unit in the case of an adjusting drive for longitudinal adjustment. It converts the kinetic energy which is introduced between the casing unit and the gear unit over a predefined deformation travel into plastic deformation of an energy absorption element. As a result, braking which is evened out over the deformation travel or structurally predefined braking takes place.

In the energy absorption apparatus, for energy absorption, a slot (what is known as a crash slot) can be widened plastically over its length by way of a deformation member which is moved along in it in the case of a crash, for example a mandrel which has an oversize with respect to the crash slot. In alternative designs, a deformation element can have, for example, a bending tab which is continuously bent over plastically over a displacement travel of the actuating unit relative to the supporting unit, or as a tear-off tab which is severed by way of the relative movement in the case of a crash, or a combined bending/tear-off tab. The energy absorption can also take place in further ways, for example by way of cutting of a crash element by way of a moving chisel or the like.

It is provided in one advantageous embodiment that the gear unit has a deformation member, by which an energy absorption element can be deformed plastically in the case of a movement of the gear unit relative to the supporting unit. The deformation member can comprise a mandrel which projects from the gear element, for example on the outside on the gear housing, which mandrel dips into a crash slot which is elongate in the direction of the spindle axis. The cross section of the mandrel is wider than the crash slot which is fixed relative to the supporting unit and, for example, is configured in an energy absorption element which is fixed on the casing unit. As an alternative, the gear unit can have a type of anvil, by way of which an energy absorption element is compressed or stretched plastically in the case of a crash. It is likewise conceivable that the deformation member has a through opening, through which a deformation strip can be pulled with plastic deformation in the case of a crash.

It is advantageous that the energy absorption device has a guide device, in which the gear unit can slide along in the case of a crash. The guide device can comprise, for example, a rail, for example an elongate U-profile which can be fastened to the casing unit parallel to the longitudinal axis, and in which the gear unit is held during normal operation and can slide along in the case of a crash.

An energy absorption element can be configured between the gear unit and the guide device. For example, the gear unit can have a projecting mandrel on a gear housing, which mandrel dips into a crash slot which is configured in a U-profile. The mandrel has a multiple function, namely holding the gear unit during normal operation, and guiding it in the case of a crash, and bringing about the energy absorption by way of plastic widening.

It can be provided, furthermore, that the energy absorption device has a switching device, by which at least one energy absorption element between the gear unit and the supporting unit can be coupled or decoupled. The energy absorption capability (what is known as the crash level) can be decreased or increased as required by way of the switching device. To this end, one or more energy absorption elements between the gear unit and the supporting unit can be coupled or decoupled by means of a switching element which comprises, for example, a pyro-electric actuator (what is known as a pyroswitch), and can be activated or deactivated as a result. For example, a plurality of mandrels can be provided in an energy absorption apparatus, which mandrels can selectively be brought into or out of engagement with one or more crash slots by means of a pyroswitch, or mandrels with a different cross section for different widening of a crash slot can be activated or deactivated.

A rupture element can be arranged between the gear unit and the supporting unit. It can be configured, for example, as a shear pin, and fixes the gear unit relative to the supporting unit during normal operation. The rupture element ruptures only if a high force threshold which occurs only in the case of a crash is exceeded, and releases the relative movement of the gear unit and the supporting unit, the energy absorption apparatus becoming active.

Figure 2:
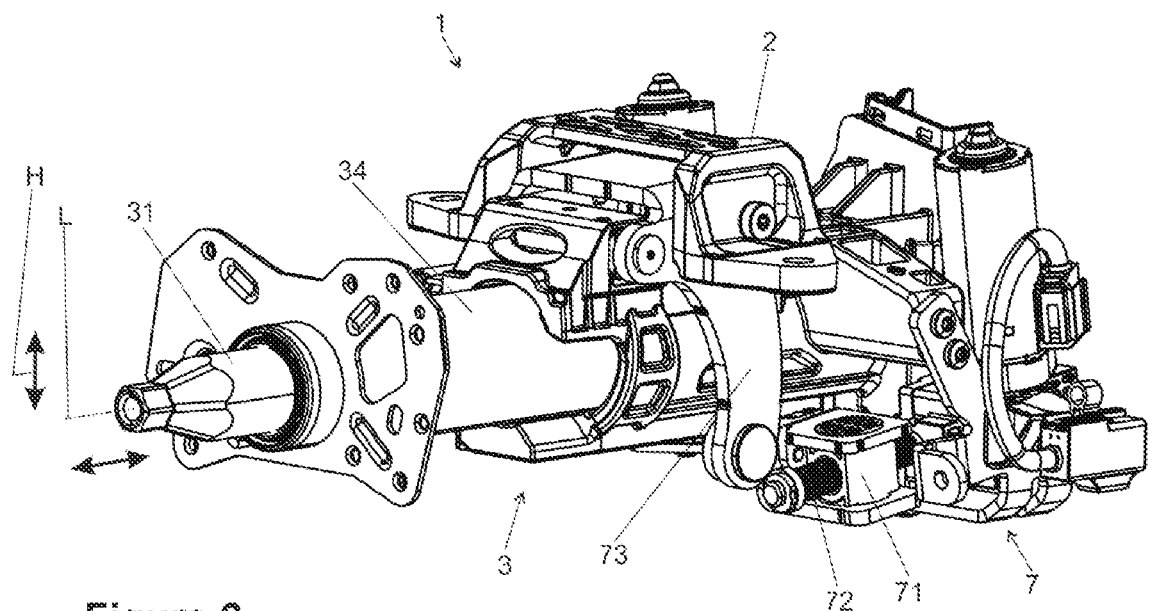
FIG. 2 is a diagrammatic perspective view of the steering column according to FIG. 1 from an opposite side.
Figure 3:
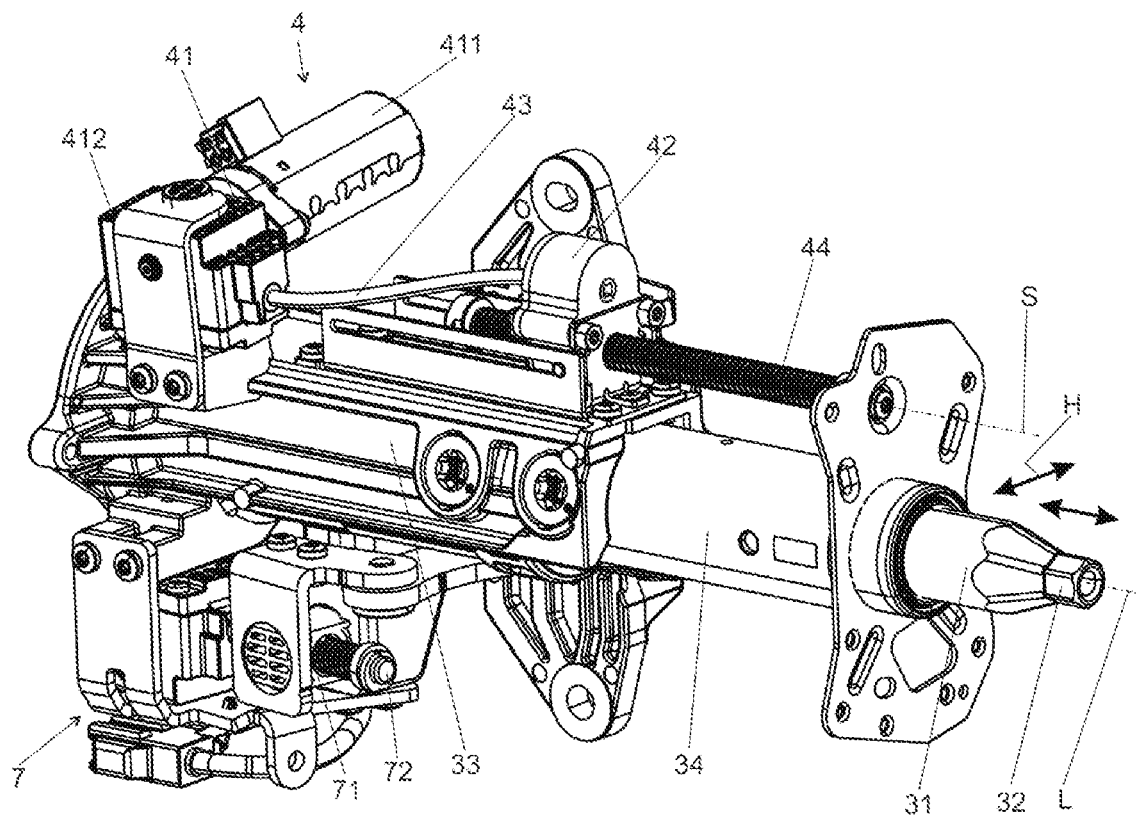
FIG. 3 is a diagrammatic perspective view of the steering column according to FIG. 1 from below.

FIGS. 1, 2 and 3 show a steering column 1 according to the invention in diagrammatic perspective views obliquely from the top left (FIG. 1) and obliquely from the right (FIG. 2) and from below (FIG. 3) toward the rear end, as viewed in the driving direction of a vehicle (not shown).

The steering column 1 comprises a supporting unit 2 which can be attached via fastening bores 21 to a vehicle body (not shown). An actuating unit 3 is held by the supporting unit 2, in which actuating unit 3 a steering spindle 31 is mounted such that it can be rotated about a longitudinal axis L. The actuating unit 3 is supported on the supporting unit 2 in the direction of the longitudinal axis L. At the rear end with regard to the driving direction, the steering spindle 31 is provided with a fastening section 32 for attaching a steering wheel (not shown here).

The actuating unit 3 has a casing unit 33 which is mounted such that it can be pivoted relative to the supporting unit 2, with the result that the fastening section 32 can be adjusted in a vertical direction H for vertical adjustment.

A casing tube 34 (also called an inner casing tube or an internal casing tube) can be adjusted in the casing unit 33 in an axially telescopic manner in the longitudinal direction, that is to say the direction of the longitudinal axis L, in order to realize a longitudinal adjustment, as indicated by way of the double arrow.

For the longitudinal adjustment, an adjusting drive 4 according to the invention is provided which comprises a drive unit 41 and a gear unit 42 which are separated from one another spatially and are connected to one another via a flexible drive connection in the form of a flexible shaft 43.

The drive unit 41 comprises an electric motor 411 which is flange-connected on the input side to a step-down gear mechanism 412. On the output side, the rotatable shaft core of the flexible shaft 43 is coupled to the step-down gear mechanism 412. The drive unit 41 is fastened to the casing unit 33, and is connected fixedly to the supporting unit 2 in this way at least in the direction of the longitudinal axis L.

Figure 4:
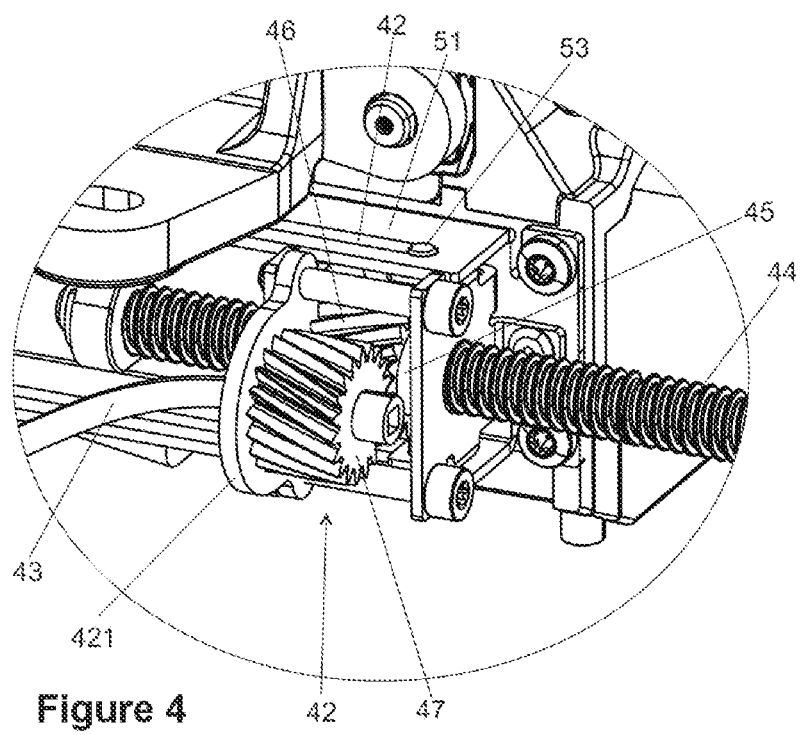
FIG. 4 is a detail view of an example gear unit of the steering column according to FIG. 1 in an open state.

The gear unit 42 has a gear housing 421 which is partially omitted in the view of FIG. 4, in order to provide a view of the interior.

The adjusting drive 4 is configured as what is known as a plunger spindle drive, with a threaded spindle 44 which extends with its spindle axis S parallel to the longitudinal axis L, and which is connected to the casing tube 34 in a manner which is secured against relative rotation with respect to the longitudinal axis L.

The threaded spindle 44 is screwed into a spindle nut 45 which is connected coaxially to a gearwheel 46 which is mounted in the gear unit 42 so that it can be rotated about the spindle axis S. The spindle thread which is not shown in detail can also be configured in the gearwheel 46, as a result of which the spindle nut 45 is therefore of integrated configuration.

An intermediate gear 47 has a toothing system which corresponds with the gearwheel 46, and is mounted in the gear unit 42, with the result that it meshes with the gearwheel 46. The intermediate gear 47 is coupled in a torque-transmitting manner to the flexible shaft 43.

Figure 5:
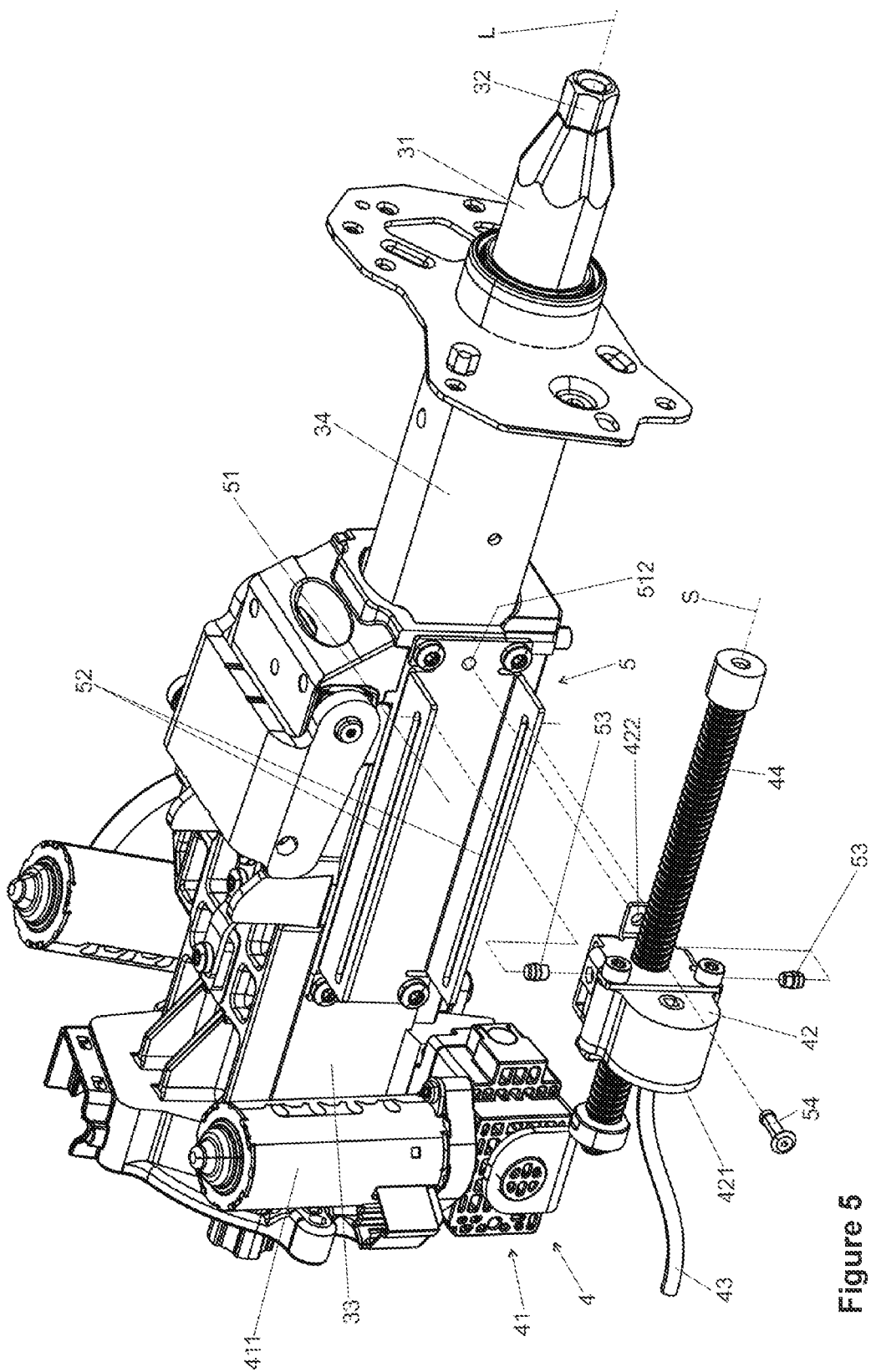
FIG. 5 is a diagrammatic perspective view of the steering column according to FIG. 1 in a partially exploded state.

An energy absorption device 5 is arranged between the gear unit 42 and the casing unit 33, the functional elements of which energy absorption device 5 can be seen in the illustration of FIG. 5, in which the spindle drive including the gear unit 42 and the threaded spindle 44 is shown diagrammatically in a manner which is exploded transversely with respect to the longitudinal axis L.

The energy absorption apparatus 5 comprises an elongate, U-shaped guide profile 51 which is fixed by means of screws laterally to the supporting unit 2 parallel to the longitudinal axis L. As can be seen in FIGS. 1, 3 and 4, the gear unit 42 is held between the U-limbs of the guide profile 51.

For the actual energy absorption, the guide profile 51 has crash slots 52 which are elongate in the direction of the longitudinal axis L. In each case one deformation member in the form of a mandrel 53 dips into each of the crash slots 52, as can be seen clearly in the detailed view of FIGS. 6 and 8.

Each mandrel 53 has a cross section with a width which is greater than the slot width of the corresponding crash slot 52.

Figure 6:
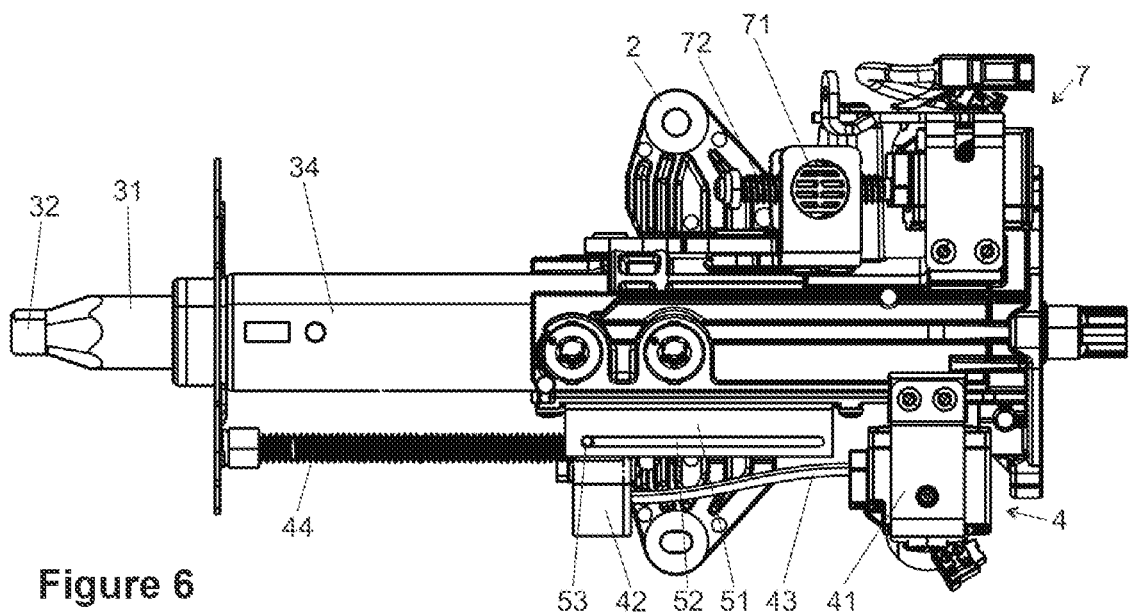
FIG. 6 is a plan view of the steering column according to FIG. 1 in a normal operating state.

In the normal operating state, that is to say before a crash case has occurred, the mandrel 53 is situated at the rear end of the crash slot 52, as shown in FIG. 6.

A rupture element in the form of a shear bolt 54 can be arranged between the gear unit 42 and the casing unit 33, which shear bolt 54 is fixed in a positively locking manner through a fastening opening 422 in the gear housing 421 in a corresponding opening 512 in the guide profile 51.

Figure 7:
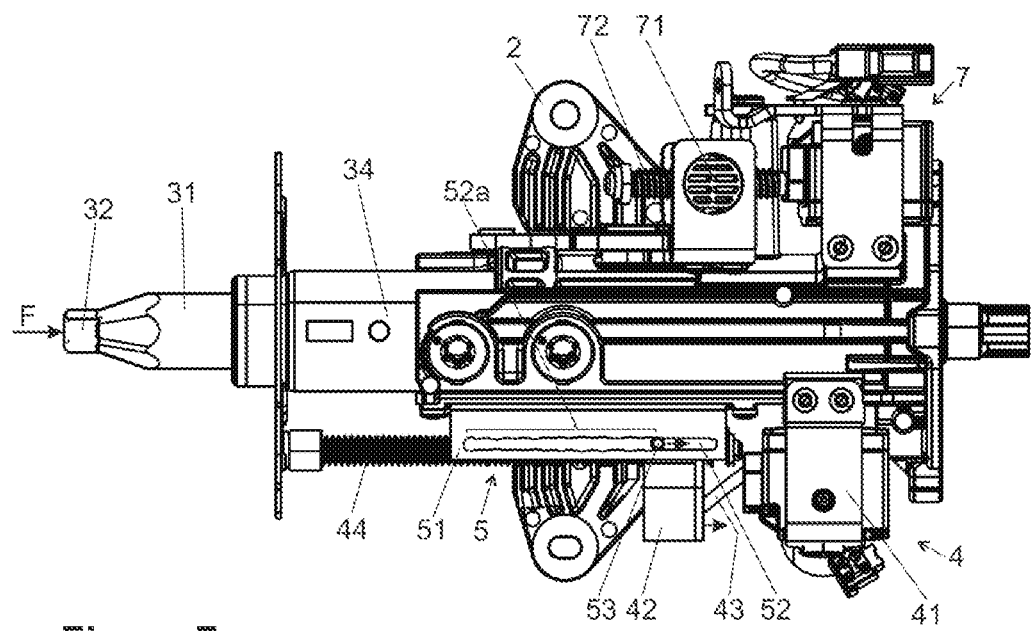
FIG. 7 is a plan view of the steering column according to FIG. 6 after a crash event.

If a great crash force F acts forward in the direction of the longitudinal axis on the steering spindle 31 in the case of a crash, as shown in FIG. 6, said crash force is transmitted via the casing tube 34 and the threaded spindle 44 which is supported on it, the spindle nut 45 and the gearwheel 46 to the gear unit 42. If the crash force F exceeds a predefined limit value, the shear bolt 54 ruptures. The gear unit 42 is then moved along the guide profile 51 by way of the crash force F, as indicated in FIG. 7 by way of the arrow on the gear unit 42. Here, the casing tube 34, the steering spindle 31, the threaded spindle 44 and the gear unit 42 move relative to the guide profile 51, the casing unit 33 and the drive unit 41 with the absorption of energy.

By way of the relative movement in the case of a crash, the mandrel 53 is moved along in the crash slot 52, as a result of which said crash slot 52 is plastically widened progressively with the absorption of kinetic energy. The section 52a which is widened in the process can be seen in FIG. 7.

As can be seen from FIGS. 6 and 7, the drive unit 41 remains in its position relative to the casing unit 33 and to the supporting unit 2. The relative movement in the case of a crash brings about a deformation and therefore yielding of the flexible shaft 43, as a result of which the relative movement of the gear unit 42 for energy absorption is practically not impaired. In the case of a crash, therefore, the gear unit 42 can be displaced relative to the drive unit 41.

Figure 8:
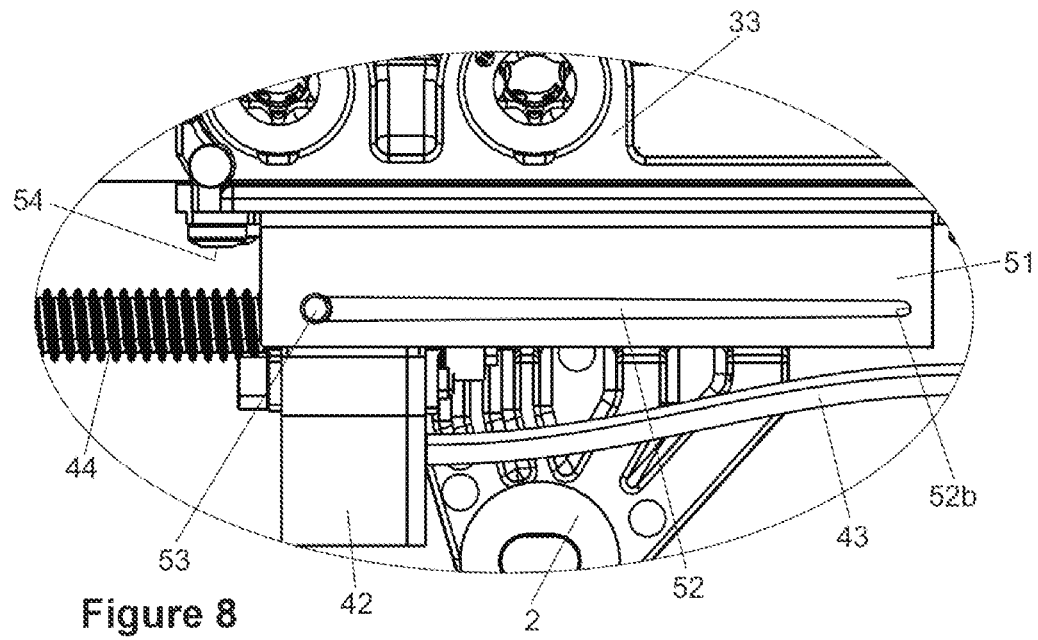
FIG. 8 is an enlarged detail view of another example energy absorption device in a normal operating state.

FIG. 8 shows a second embodiment, in the case of which the crash slot 52 tapers in a wedge-shaped manner toward its front end 52b (to the right in the drawing). As a result, in the case of a crash, the deformation work which is required for widening increases along the crash travel of the gear unit 42 relative to the casing unit 33, with the result that a progressive energy absorption characteristic is realized. Here, the crash slot 52 has side walls, said side walls preferably converging in a wedge-shaped manner at an angle of less than or equal to 10°.

Figure 9:
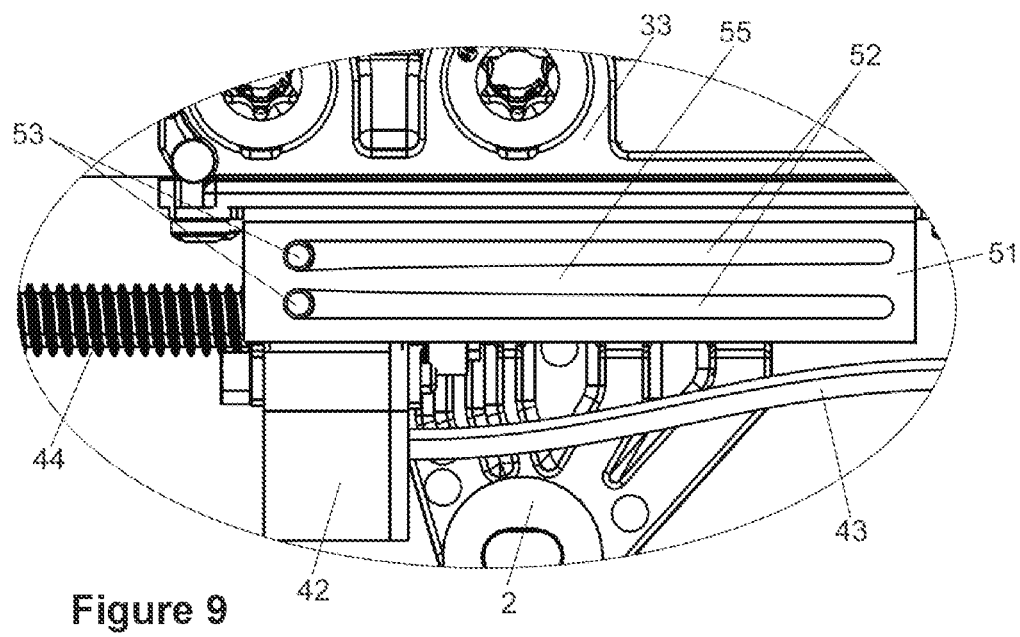
FIG. 9 is an enlarged detail view of still another example energy absorption device in a normal operating state.
Figure 10:
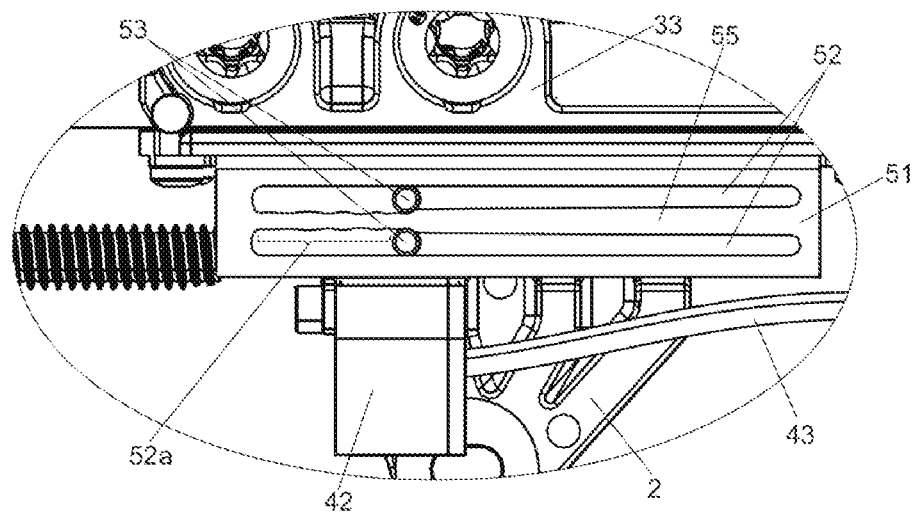
FIG. 10 is an enlarged detail view of the energy absorption device according to FIG. 9 after a crash event.

FIGS. 9 and 10 show a third embodiment which has two crash slots 52 which run adjacently in a limb of the U-profile 51. While the outer outside edges of the two slots 52 run in parallel, the inner edges delimit a web 55 which tapers in a wedge-shaped manner toward the rear and, after the case of a crash, is deformed plastically in the widened section 52a, as shown in FIG. 10. Here, two mandrels 53 are provided, said mandrels being spaced apart from one another and the web 55 being arranged between them. In the case of a crash, the mandrels 53 are displaced relative to the web 55 of the guide profile 51, said web 55 being moved through the mandrels 53 and being deformed plastically in the process. This can be gathered particularly clearly from FIG. 10, in the case of which a section of the web 55 is deformed.

Figure 11:
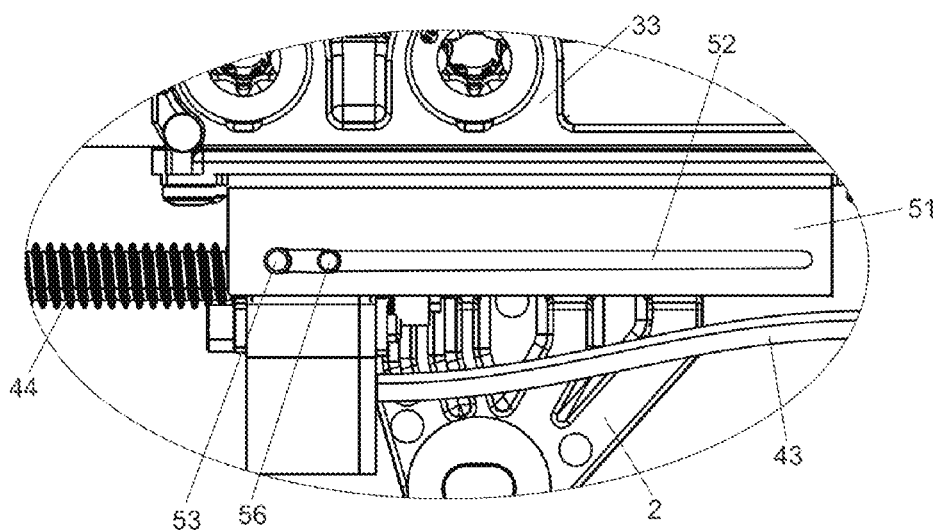
FIG. 11 is an enlarged detail view of a still further example energy absorption device in a normal operating state.

The fourth embodiment which is shown in FIG. 11 differs from the embodiment which is shown in FIG. 8 in that there is an additional, second mandrel 56 which has a smaller cross section than the first mandrel 53. By virtue of the fact that the first mandrel 53 can optionally be removed from the crash slot 52 by means of a pyrotechnical actuator (not shown), only the second mandrel 56 is then active. As a result of its smaller cross section, a smaller amount of deformation work has to be applied for the passage through the crash slot 52. In this way, a lower crash level can be set by way of deactivation of the first mandrel 53. In this way, two different crash levels can be produced in a simple way.

Figure 12:
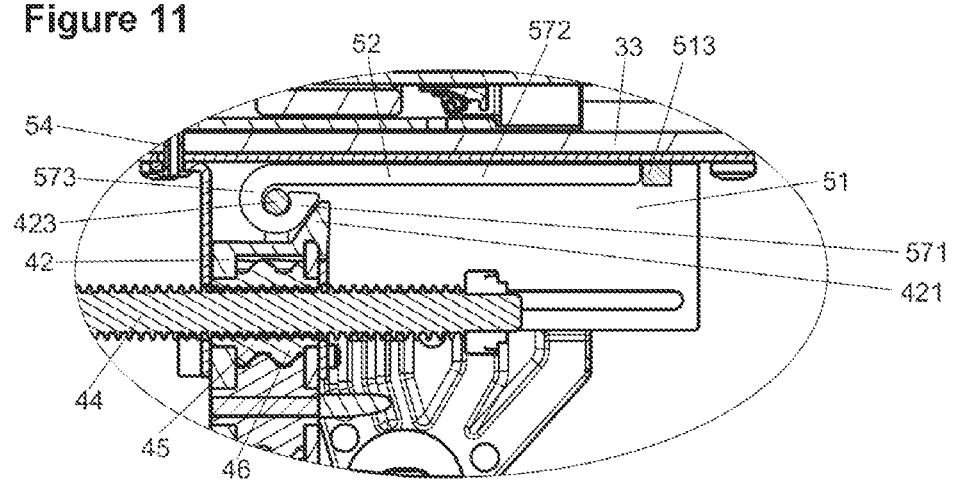
FIG. 12 is a diagrammatic longitudinal sectional view through a further example energy absorption device.

FIG. 12 diagrammatically shows a longitudinal section through the energy absorption device 5. It is apparent from this that an additional or alternative energy absorption element can be arranged in the form of a bending strip 57 between the gear unit 42 and the casing unit 33. The bending strip 57 is hooked by way of an inlet-side limb 571 in the direction of the spindle axis S behind a driver 423 which is configured on the gear unit 42. The other, outlet-side limb 572 is connected via a substantially U-shaped bend 573 to the first limb 571, and is supported in the direction of the longitudinal axis L against an abutment 513 on the guide profile 51 or the casing unit 33.

If, in the case of a crash, the gear unit 42 is displaced relative to the casing unit 33 in the forward direction in the direction of the longitudinal axis L (to the right in the drawing), a continuous plastic deformation of the limb 572 takes place in the bend 573 which is then run through. As a result, crash energy is likewise absorbed continuously. The dimensions of the limb 572 can vary over the longitudinal extent of the limb 572.

As an alternative or in combination, the energy absorption device 5 can have different arrangements of bending strips 57, mandrels 53, 56 which engage into crash slots 52, and other energy absorption devices which make an absorption of kinetic energy possible by way of conversion into deformation and friction.

For vertical adjustment, a second adjusting drive 7 can be provided which can be seen in FIG. 2, and is configured as a conventional rotating spindle drive in the example which is shown. Here, the spindle nut 71 which can be displaced in a translational manner and into which a rotationally drivable threaded spindle 72 engages is articulated on an adjusting lever 73 which is inserted between the casing unit 33 and the supporting unit 2 such that it can be pivoted in the vertical direction H. In a deviation from the drawing, the adjusting drive 7 can in principle also be configured like the first adjusting drive 4 according to the invention.

LIST OF DESIGNATIONS

1 Steering column
2 Supporting unit
21 Fastening bores
3 Actuating unit
31 Steering spindle
32 Fastening section
33 Casing unit
34 Casing tube
4 Adjusting drive
41 Drive unit
411 Motor
412 Step-down gear mechanism
42 Gear unit
421 Gear housing
422 Fastening opening
423 Driver
43 Flexible shaft
44, 72 Threaded spindle
45, 71 Spindle nut
46 Gearwheel
47 Intermediate gear
5 Energy absorption device
51 Guide profile
512 Opening
513 Abutment
52 Crash slot
52a Widened section
52b Front end
53, 56 Mandrel
54 Shear bolt
55 Web
57 Bending strip
571 Limb
572 Limb
573 Bend
7 Adjusting drive
73 Adjusting lever
L Longitudinal axis
H Vertical direction
S Spindle axis
F Crash force

What is claimed is:

1. A steering column for a motor vehicle, which steering column is adjustable via a motor, wherein the steering column comprises:
a supporting unit that is attachable to a body of the motor vehicle;
an actuating unit held by the supporting unit, wherein the actuating unit includes a jacket unit in which a jacket tube is disposed;

a steering spindle mounted in the jacket tube of the actuating unit such that the steering spindle is rotatable about a longitudinal axis;

an adjusting drive that is connected to the supporting unit and to the actuating unit, wherein the adjusting drive is configured to telescopically adjust the jacket tube of the actuating unit relative to the supporting unit along the longitudinal axis, wherein the adjusting drive includes a threaded spindle that engages in a spindle nut, wherein the adjusting drive is operatively disposed between the jacket unit and the jacket tube of the actuating unit; and a drive unit configured to drive the threaded spindle rotationally relative to the spindle nut, wherein the drive unit is connected via a flexible drive connection to a gear unit that is attached to the jacket unit and is movable spatially relative to the drive unit, wherein the threaded spindle is connected to the jacket tube and is configured to translate relative to the gear unit.

2. The steering column of claim 1 wherein the flexible drive connection includes a flexible shaft.

3. The steering column of claim 1 wherein the gear unit comprises a gearwheel that is connected fixedly to and rotates with the spindle nut or the threaded spindle, wherein the gearwheel is rotatably drivable by the drive connection.

4. The steering column of claim 1 wherein the drive unit comprises a drive motor to which the drive connection is connected on an output side.

5. The steering column of claim 1 comprising an energy absorption device disposed between the gear unit and the supporting unit.

6. The steering column of claim 5 wherein the energy absorption device includes a first energy absorption element that is plastically deformable upon movement of the gear unit in a direction of an axis of the threaded spindle relative to the supporting unit.

7. The steering column of claim 6 wherein the gear unit includes a deformation member by which a second energy absorption element is plastically deformable upon movement of the gear unit relative to the supporting unit.

8. The steering column of claim 6 wherein the energy absorption device includes a switching device for coupling or decoupling the second energy absorption element between the gear unit and the supporting unit.

9. The steering column of claim 1 comprising a rupture element disposed between the gear unit and the supporting unit.

10. A steering column for a motor vehicle, which steering column is adjustable via a motor, wherein the steering column comprises:

a supporting unit that is attachable to a body of the motor vehicle;

an actuating unit held by the supporting unit;

a steering spindle mounted in the actuating unit such that the steering spindle is rotatable about a longitudinal axis;

an adjusting drive that is connected to the supporting unit and to the actuating unit, wherein the adjusting drive is configured to adjust the actuating unit relative to the supporting unit, wherein the adjusting drive includes a threaded spindle that engages in a spindle nut;

a drive unit configured to drive the threaded spindle rotationally relative to the spindle nut, wherein the drive unit is connected via a flexible drive connection to a gear unit that is movable spatially relative to the drive unit; and an energy absorption device disposed between the gear unit and the actuating unit.

11. The steering column of claim 10 wherein the energy absorption device comprises an elongate, U-shaped guide profile.

12. The steering column of claim 11 wherein the elongate, U-shaped guide profile is attached directly to the supporting unit.

13. The steering column of claim 10 wherein a guide profile of the energy absorption device includes crash slots that are elongated in a direction of the longitudinal axis, wherein a deformation member extends into each of the crash slots.

14. The steering column of claim 13 wherein aside from a location of each crash slot where each deformation member is located prior to a crash event, a cross section of each deformation member is larger than a slot width of each crash slot such that movement of each deformation member relative to each crash slot requires deformation of the guide profile along a length of each crash slot.

15. The steering column of claim 10 configured such that in a crash event a crash force is transmitted via a casing tube of the actuating unit, the threaded spindle, and the spindle nut to the gear unit, wherein a shear bolt is configured to rupture upon the crash force exceeding a predefined limit value, wherein after the shear bolt ruptures the casing tube, the steering spindle, the threaded spindle, and the gear unit are configured to move relative to a guide profile of the energy absorption device and the drive unit.

16. The steering column of claim 10 wherein a guide profile of the energy absorption device includes a crash slot that is elongated in a direction of the longitudinal axis, wherein the crash slot tapers in a wedge-shaped manner, with side walls of the crash slot converging at an angle of less than or equal to 10°.

17. The steering column of claim 10 wherein a guide profile of the energy absorption device includes a first crash slot and a second crash slot that are elongated in a direction of the longitudinal axis, wherein outer elongate edges of the crash slots that are farthest from one another are parallel, wherein inner elongate edges of the crash slots that are closest to one another are transverse to one another.

18. The steering column of claim 10 wherein a guide profile of the energy absorption device includes a crash slot that is elongated in a direction of the longitudinal axis, wherein a first mandrel and a second mandrel extend into the crash slot.

19. The steering column of claim 18 wherein the second mandrel has a smaller cross section than the first mandrel.

20. The steering column of claim 18 the first mandrel is configured to be moved into and out of engagement with the crash slot such that the energy absorption device can provide two different levels of energy absorption.

* * * * *